US010437927B2

(12) United States Patent
SanGiovanni et al.

(10) Patent No.: US 10,437,927 B2
(45) Date of Patent: Oct. 8, 2019

(54) SYSTEMS AND METHODS FOR DELIVERING COMPILED-CONTENT PRESENTATIONS

(71) Applicant: Zumobi, Inc., Seattle, WA (US)

(72) Inventors: John SanGiovanni, Seattle, WA (US); Max Herzig, Seattle, WA (US); Evash Beresiwsky, Seattle, WA (US); Morgan Colton, Seattle, WA (US)

(73) Assignee: Zumobi, Inc., Seattle, WA (US)

( * ) Notice: Subject to any disclaimer, the term of this patent is extended or adjusted under 35 U.S.C. 154(b) by 123 days.

(21) Appl. No.: 15/474,850

(22) Filed: Mar. 30, 2017

(65) Prior Publication Data

US 2018/0225015 A1    Aug. 9, 2018

Related U.S. Application Data

(63) Continuation-in-part of application No. 15/429,118, filed on Feb. 9, 2017.

(51) Int. Cl.
*G06F 3/048*    (2013.01)
*G06F 17/24*    (2006.01)
*G06F 17/22*    (2006.01)
*G06F 16/958*   (2019.01)

(52) U.S. Cl.
CPC .......... *G06F 17/248* (2013.01); *G06F 16/986* (2019.01); *G06F 17/2229* (2013.01); *G06F 17/2247* (2013.01)

(58) Field of Classification Search
CPC ............. G06F 17/2229; G06F 17/2247; G06F 17/30896
See application file for complete search history.

(56) References Cited

U.S. PATENT DOCUMENTS

| | | |
|---|---|---|
| 8,429,559 B2 | 4/2013 | Gaucas et al. |
| 9,781,457 B1 | 10/2017 | James et al. |
| 2006/0294074 A1 | 12/2006 | Chang |
| 2008/0208796 A1 | 8/2008 | Messer et al. |
| 2008/0288338 A1 | 11/2008 | Wiseman et al. |

(Continued)

OTHER PUBLICATIONS

Zumobi, Zumobi Bank of America—Special Olympics Pass the Flame Mobile Experience, Nov. 5, 2015, Vimeo, https://vimeo.com/144788236.*

*Primary Examiner* — Justin R. Blaufeld
*Assistant Examiner* — Mohamed Abou El Seoud
(74) *Attorney, Agent, or Firm* — Norton Rose Fulbright US LLP

(57) ABSTRACT

The present disclosure describes methods and a graphical user interface implementing techniques for delivering an integrated mobile graphical media presentation, including optimized compiled-content provided from at least one compiled-content source, executed in a mobile device. A technique is provided that includes generating the integrated mobile graphical media presentation. A display format for delivery of the integrated mobile graphical media presentation is determined. The technique also includes defining a second layout for the plurality of display frames of the integrated mobile graphical media presentation based on the determined display format, and displaying, based on the second layout, the selectable tiles housed by the plurality of display frames within the sub-content display window.

16 Claims, 7 Drawing Sheets

(56) References Cited

U.S. PATENT DOCUMENTS

| | | |
|---|---|---|
| 2011/0138331 A1 | 6/2011 | Pugsley et al. |
| 2012/0278704 A1* | 11/2012 | Ying .................. G06F 17/2247 |
| | | 715/243 |
| 2013/0031456 A1 | 1/2013 | Fu et al. |
| 2013/0132366 A1 | 5/2013 | Pieper |
| 2013/0166390 A1 | 6/2013 | Blow et al. |
| 2013/0204664 A1 | 8/2013 | Romagnolo et al. |
| 2013/0290289 A1 | 10/2013 | Yu et al. |
| 2014/0006934 A1 | 1/2014 | Wang et al. |
| 2014/0012923 A1 | 1/2014 | Caldwell et al. |
| 2014/0059247 A1* | 2/2014 | Vachharajani .......... H04L 47/24 |
| | | 709/234 |
| 2014/0120513 A1 | 5/2014 | Jenkins et al. |
| 2015/0073922 A1 | 3/2015 | Epperson et al. |
| 2015/0088621 A1 | 3/2015 | Shinohara et al. |
| 2015/0106687 A1 | 4/2015 | McLaughlin et al. |
| 2015/0363488 A1 | 12/2015 | Hoyne et al. |

* cited by examiner

SYSTEMS AND METHODS FOR DELIVERING COMPILED-CONTENT PRESENTATIONS

CROSS-REFERENCE TO RELATED APPLICATION

The present application is a continuation-in-part of U.S. patent application Ser. No. 15/429,118 filed Feb. 9, 2017 and entitled "SYSTEM AND METHOD FOR GENERATING AN INTEGRATED MOBILE GRAPHICAL EXPERIENCE USING COMPILED-CONTENT FROM MULTIPLE SOURCES," the disclosure of which is incorporated herein by reference in its entirety.

TECHNICAL FIELD

The present application generally relates to delivering an integrated mobile graphical media presentation, for execution on a mobile device, through a sub-content window.

BACKGROUND

Companies possess and/or generate a great amount of content from multiple, and in some cases disparate, sources. Such content may include video clips, blogs, social media posts, long form articles, promotions, etc. Distributing content to users is typically done using a platform that is specific to the type of content being distributed. For example, a social media post may typically be consumed by a user using a social media application, and a web article may be consumed by a user using a web browser. Thus, content distribution systems and mobile devices lack the capability and functionality to compile and integrate the content from the different sources for distribution to mobile devices and for presentation on an integrated mobile graphical media presentation.

Furthermore, the content being produced is typically not optimized for distribution to a particular platform, for example, a mobile device. Oftentimes, particular content may include high quality images, or may be a high quality video, which is not suitable for consumption at the mobile device, given the limitations of the mobile device with respect to bandwidth, graphical user interface (GUI) space, battery life, storage capacity, etc. Additionally, the format of the content from the different sources may be different for each source. Therefore, content distribution systems and mobile devices also lack capability and functionality to optimize content from multiple sources for distribution to and consumption by a mobile device.

Moreover, new content is constantly being generated, but typical distribution systems may not possess the functionality to dynamically update the mobile graphical media presentation with the newly generated content. Even more, typical systems lack the functionality to identify content that may be relevant to a particular user and to update the mobile graphical media presentation with only the relevant content.

Another problem with current content distribution systems is that these systems lack certain capabilities for delivering an integrated mobile graphical media presentation on a GUI through advertising. A GUI may be configured with an advertising window, on which content may be displayed, but currently, the content displayed in the advertising window is limited to a particular item, which, when selected by a user, may result in presentation of a single content item. However, there is no mechanism in the existing systems for pushing an integrated mobile graphical media presentation, that includes multiple objects of compiled-content, from multiple sources, via the single advertising window.

In light of the problems and limitations of content distribution systems and mobile devices, better content distribution systems and techniques are needed.

BRIEF SUMMARY

The present disclosure describes techniques and systems for optimizing systems which integrate compiled-content from multiple content sources and generating an integrated mobile graphical media presentation. Systems may also include improved delivery methods for the integrated mobile graphical media presentation on a GUI. Further, systems may improve mobile devices to provide for an improved GUI for presentation of the optimized compiled-content from the different sources on the integrated mobile graphical media presentation. An integrated mobile graphical media presentation herein may refer to the collection, aggregation, and delivery of content with graphical frames corresponding to display objects laid out according to a layout defined by a template.

In accordance with one aspect, a method for delivering an integrated mobile graphical media presentation in a GUI is disclosed. The method may include generating the integrated mobile graphical media presentation. In some aspects, generating the integrated mobile graphical media presentation includes formatting compiled-content provided from at least one compiled-content source to generate a plurality of compiled-content display objects, generating a plurality of display frames for the integrated mobile graphical media presentation, each display frame in the plurality of display frames housing a selectable tile corresponding to a respective compiled-content display object of the plurality of compiled-display objects from the at least one compiled-content source, and defining a first layout of the plurality of display frames on the integrated mobile graphical media presentation, the first layout being defined by a template based on the data formats of the respective compiled-content display objects corresponding to each selectable tile housed by each display frame in the plurality of display frames. In some aspects, the first layout is configured to concurrently display multiple frames of the plurality of frames.

Methods may also include determining a display format for delivery of a plurality of data content items, such as in an integrated mobile graphical media presentation, and generating a sub-content display window having the determined display format on at least a first portion of the GUI. The method further may include defining a layout for the plurality of display frames of the integrated mobile graphical media presentation based on the determined display format. In some aspects, this layout specifies a sequential manner to present the selectable tiles housed by the plurality of display frames within the sub-content display window. The method also includes displaying, based on the layout, the selectable tiles housed by the plurality of display frames within the sub-content display window.

In accordance with another aspect, a GUI of a processor-based mobile device optimized for delivering an integrated mobile graphical media presentation is disclosed. The GUI includes a portion for displaying a sub-content display window. In some aspects, a plurality of selectable icons is displayed in a sequential order in the sub-content display window. Each selectable icon corresponds to a respective display object containing a data item received from at least one compiled-content source. In other aspects, the compiled-content in the respective display objects may have a plurality of data formats. For example, each respective display object may be associated with a topic of the integrated mobile graphical media presentation. In yet further aspects, the portion of the compiled-content in the respective display object may be reformatted from an original format received from the compiled-content sources based on optimization requirements. In aspects, displaying the plurality of selectable icons in a sequential manner may be implemented based on a first layout defined by a template based on a determined display format for delivery of the integrated mobile graphical media presentation.

The GUI may be configured to, upon selection of at least one selectable icon, display the integrated mobile graphical media presentation according to a second layout. In some aspects, the display of the integrated mobile graphical media presentation may graphically replace the display of the sub-content display window on the GUI. The GUI may also be configured to automatically display the contents of the respective display object corresponding to the selected icon. In some aspects, the automatic display of the contents of the respective display object may graphically replace the display of the integrated mobile graphical media presentation. In other aspects, an option may be provided for closing the display of the content of the respective display object. The GUI may be further configured to accept a selection of the option for closing the display the contents of the respective display object. Upon receiving a selection of the option for closing the display, the GUI may close the second display window and may return to displaying the integrated mobile graphical media presentation according to the second layout.

In some aspects, the compiled-content sources may include a plurality of compiled-content sources providing compiled-content having different formats. In these aspects, the compiled-content from at least one compiled-content source of the plurality of compiled-content sources may be reformatted for generating the integrated mobile graphical media presentation. In other aspects, the compiled-content from at least one other compiled-content source of the plurality of compiled-content sources may not be reformatted and may be rendered onto the integrated mobile graphical media presentation in the original format.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

To address the problems and limitations of content distribution systems and mobile devices, various aspects of the present disclosure are directed to systems and techniques for improving distribution systems to accomplish one or more of: optimizing compiled-content from different sources for generating an integrated mobile graphical media presentation, delivering the integrated mobile graphical media presentation on a GUI, and improving mobile devices to provide for an improved GUI for presentation and interaction with the optimized compiled-content from the different sources on the integrated mobile graphical media presentation.

Thus, it should be appreciated that the techniques and systems disclosed herein provide a technical solution to technical problems existing in the conventional industry practice of compiled-content distribution and presentation systems. Furthermore, the techniques and systems disclosed herein embody a distinct process that provides an improvement to existing computer systems by providing the computer systems with new capabilities and functionality for integrating and optimizing compiled-content from different sources for generating an integrated mobile graphical media presentation, for delivering the integrated mobile graphical media presentation on a GUI, and for improving a GUI of a mobile device for presentation of the optimized compiled-content from the different sources on the integrated mobile graphical media presentation, which prior art computer systems do not possess.

Figure 1:
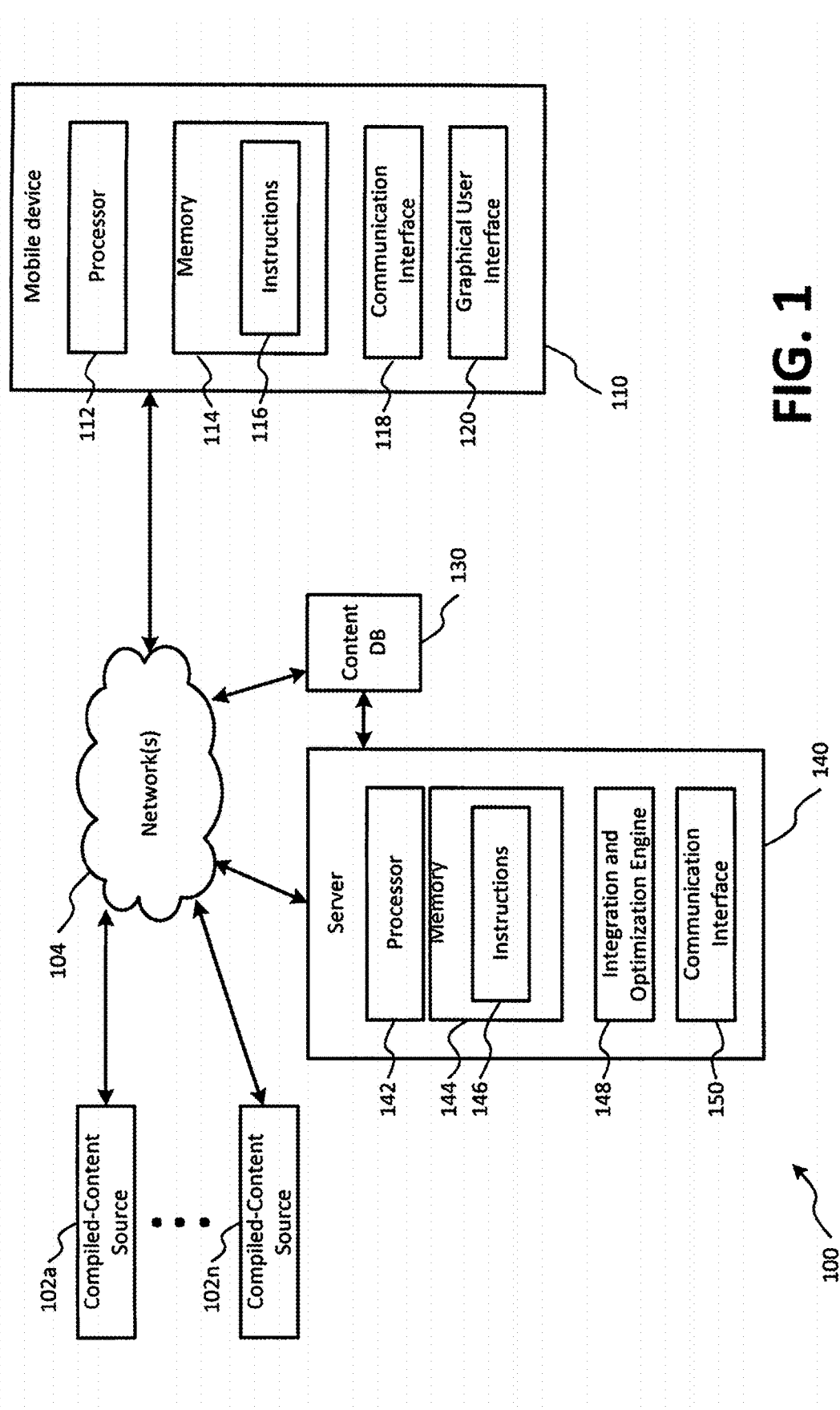
FIG. 1 is a block diagram of a system configured for generating and delivering an integrated mobile graphical media presentation on a GUI, and for improving mobile devices to provide for an improved a GUI of a mobile device for presentation of the optimized compiled-content from the different sources on the integrated mobile graphical media presentation.

Referring to FIG. 1, a block diagram of an exemplary system configured with capabilities and functionality for delivering an integrated mobile graphical media presentation in a GUI is shown as system 100. As shown in FIG. 1, system 100 includes mobile device 110, server 140, content database (DB) 130, compiled-content sources 102*a-n*, and network(s) 104. System 100 may facilitate collection, optimization, reformatting, and aggregation of compiled-content, received from compiled-content sources 102*a-n*, generation of graphical frames for housing display objects from the compiled-content for generation of an integrated mobile graphical media presentation, based on the format of the compiled-content, for delivery to a GUI of mobile device 110, as described in detail below. Techniques for generating and distributing an integrated mobile graphical media presentation are disclosed in related, co-owned U.S. patent application Ser. No. 15/429,118, titles "SYSTEM AN METHOD FOR GENERATING AN INTEGRATED MOBILE GRAPHICAL EXPERIENCE USING COMPILED-CONTENT FROM MULTIPLE SOURCES," filed Feb. 9, 2017, the disclosure of which is hereby incorporated herein by reference in its entirety. Additionally, systems, methods, and computer-readable storage media that provide secure delivery of compiled-content to a mobile device, and that provide for validation that the content has not been tampered with or altered prior to distributing the content to a mobile device, are disclosed in related, co-owned U.S. Pat. No. 9,438,690, entitled "SYSTEM AND METHOD FOR INSERTING OWNED MEDIA CONTENT INTO MOBILE APPLICATIONS," filed Dec. 8, 2014, the disclosure of which is hereby incorporated herein by reference in its entirety.

It is noted that compiled-content may refer to content owned by a particular entity, for example content produced or acquired by a particular entity and may refer to a particular product or article. Compiled-content may additionally refer to content curated by a particular entity. For example, curated-content may refer to content sourced from various and/or different sources and may be related to a particular brand or product. Compiled-content may additionally refer to content published by a particular entity. For example, publisher-content may refer to content published by a particular entity and may refer to a particular product or article. Compiled-content may refer to content having different data formats, e.g., news articles, Rich Site Summary (RSS) feeds content, video clips, blogs, social media posts, long form articles, promotional advertisements, etc. The compiled-content may be particularly related to a product or article (e.g., a consumer product, a promotional campaign, a product brand, a consumer activity, etc.). Compiled-content sources may refer to any system or platform that generates, stores, or otherwise makes content available (e.g., social media streams, blogs, video sources, news sources, websites, media servers, RSS feeds, etc.).

Mobile device 110 may be a smartphone, a tablet computing device, a computer system of a vehicle, a smart television, a personal digital assistant (PDA), a smart watch, a global positioning system (GPS) device, etc. Mobile device 110 may include processor 112, memory 114, communication interface 118, and GUI 120. Memory 114 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 114 may store instructions 116 that, when executed by processor 112, cause processor 112 to perform operations described in connection with mobile device 110 with reference to FIGS. 1-5. As described in more detail below, GUI 120 of mobile device 110 may be optimized for delivering an integrated mobile graphical media presentation, including optimized compiled-content provided from at least one compiled-content source. It is noted that although the present disclosure is discussed with respect to a mobile device, this is done for illustrative purposes and the systems and techniques herein are also applicable for devices that are not considered mobile devices, such as personal computers, smart televisions, desktop computers, and the like.

Communication interface 118 may be configured to communicatively couple mobile device 110 to one or more networks, such as network 104, as shown in FIG. 1. Communication interface 118 may be configured to communicatively couple mobile device 110 to network 104 via a wired or wireless connection established according to one or more communication protocols or standards (e.g., an Ethernet protocol, a transmission control protocol/internet protocol (TCP/IP), an Institute of Electrical and Electronics Engineers (IEEE) 802.11 protocol, and an IEEE 802.16 protocol, a 3rd Generation (3G) protocol, a 4th Generation (4G)/long term evolution (LTE) protocol, etc.).

Network 104 may be a wired network, a wireless network, or may include a combination of wired and wireless networks. For example, network 104 may include a local area network (LAN), a wide area network (WAN), a wireless WAN, a wireless LAN (WLAN), a metropolitan area network (MAN), a wireless MAN network, a cellular data network, a cellular voice network, the internet, other types of public and private networks, or a combination thereof. Additionally, network 104 may include multiple networks operated by different entities. For example, network 104 may include a first network (e.g., a virtual private network (VPN)) operated by a first operator, and a second network (e.g., a LAN, WAN, WLAN, wireless WAN, a cellular data network, etc.) operated by a second operator. To illustrate, the first network may be a VPN network provided by an operator of server 140, and the second network may be a cellular data network provided by a cellular network service provider. The first network may provide a secure connection from compiled-content sources 102a-n to server 140 for securely providing content to server 140, and the second network may provide a connection between mobile device 110 and server 140 for distribution of the content to mobile device 110.

As shown in FIG. 1, server 140 includes processor 142, memory 144, integration and optimization engine 148, and communication interface 150. The memory 144 may include ROM devices, RAM devices, one or more HDDs, flash memory devices, SSDs, other devices configured to store data in a persistent or non-persistent state, or a combination of different memory devices. Memory 144 may store instructions 146 that, when executed by processor 142, cause processor 142 to perform operations described in connection with server 140 with reference to FIGS. 1-5. Communication interface 150 may be configured to communicatively couple server 140 to one or more networks, such as network 104, as shown in FIG. 1. Communication interface 150 may be configured to communicatively couple server 140 to network 104 via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.). As described in more detail below, integration and optimization engine 148 may be configured to integrate and optimize compiled-content from different sources to generate an integrated mobile graphical media presentation for delivery to and consumption by a mobile device. In an aspect, integration and optimization engine 148 is stored at memory 144 as instructions 146.

Content DB 130 may store content related to an integrated mobile graphical media presentation for distribution to and consumption by a mobile device generated from the compiled-content provided to integration and optimization engine 148. In an aspect, content DB 130 may be part of server 140. In other aspects, content DB 130 may be stored at a device separate from server 140, such as a network attached storage (NAS) device communicatively coupled to server 140, or may be stored at a storage area network (SAN) communicatively coupled to server 140. Additionally or alternatively, content DB 130 may be stored at a removable storage device (e.g., an external HDD, a flash drive, etc.) coupled to server 140. Furthermore, content DB 130 may be stored across multiple storage devices (e.g., in a redundant array of independent disks (RAID) configuration or across storage devices located at geographically disparate locations) integrated with or otherwise accessible to server 140. Content DB 130 may store the integrated mobile graphical media presentations generated for mobile device 110. It is noted that, although content DB 130 is described as a database, in some aspects, content DB 130 may be a content bundle, which may refer to targetable groups of content that are assembled based on specific criteria, or assembled by selecting individual content.

In an aspect, server 140 may be a single device operable to perform the operations of server 140, as described with reference to FIGS. 1-5. In other aspects, server 140 may be distributed over multiple devices, whose aggregate functionality may be configured to perform the operations of server 140 in accordance with the present disclosure. Similarly, in an aspect, integration and optimization engine 148 of server 140 may be a single component of server 140 (e.g., a single application, server module, etc.) or may be distributed over multiple devices. In such aspects, the functionality of integration and optimization engine 148 may be aggregated from the functionality of multiple modules residing in a single, or in multiple devices. Those of skill in the art would recognize that although FIG. 1 illustrates the components of server 140 as single blocks, the implementation of the components and of server 140 is not limited to a single component and, as described above, may be distributed over several components.

During operation, server 140 may receive a plurality of compiled-content data items via network 104 from a plurality of sources. For example, compiled-content from compiled-content sources 102*a-n* may be provided to integration and optimization engine 148 of server 140. Although two compiled-content sources are shown, it is noted that any number of sources may be used, and thus, the techniques disclosed herein apply to systems with more than two compiled-content sources. Compiled-content sources 102*a-n* may be any of many types of compiled-content sources. As noted above, companies generate and/or acquire a great amount of compiled-content from across many, and varied, sources. In some aspects, compiled-content sources 102*a-n* may be social media streams, blogs, video sources, news sources, websites, media servers, RSS feeds, etc. Compiled-content sources 102*a-n* may all be a source of the compiled-content having the same data format, or may each be a source of compiled-content having different data formats. For example, compiled-content source 102*a* may be a video source, while compiled-content source 102*n* may be a social media stream source. A person of ordinary skill in the art would understand that any combination of sources may be applicable.

In some aspects, the compiled-content source may be validated to ensure that the content provided to integration and optimization engine 148 is content that is actually owned by the entity for which the compiled-content is being curated and distributed. For example, a social media account may be validated to ensure that the account belongs to the entity whose compiled-content is to be curated and distributed. In aspects, the compiled-content may include content generated by the entity, and/or content generated by a party other than the entity. In some aspects, the compiled-content source may not be the author of the compiled-content but may be an authorized distribution of the compiled-content on behalf of the entity. For example, a third party may generate a video clip of a review of a product manufactured by the entity. The entity may authorize distribution of the video review of the product by providing the video review or information representative of the video review to the integration and optimization engine 148.

The compiled-content provided by compiled-content sources 102*a-n* may be originally formatted for consumption via a particular platform related to the compiled-content source. For example, a news article from a news website may be formatted as an HTML document. In another example, an RSS weblog may be formatted as an RSS feed for consumption by an RSS reader. In the examples above, it should be appreciated that the format of the content delivered is different for each of the two sources.

Figure 3:
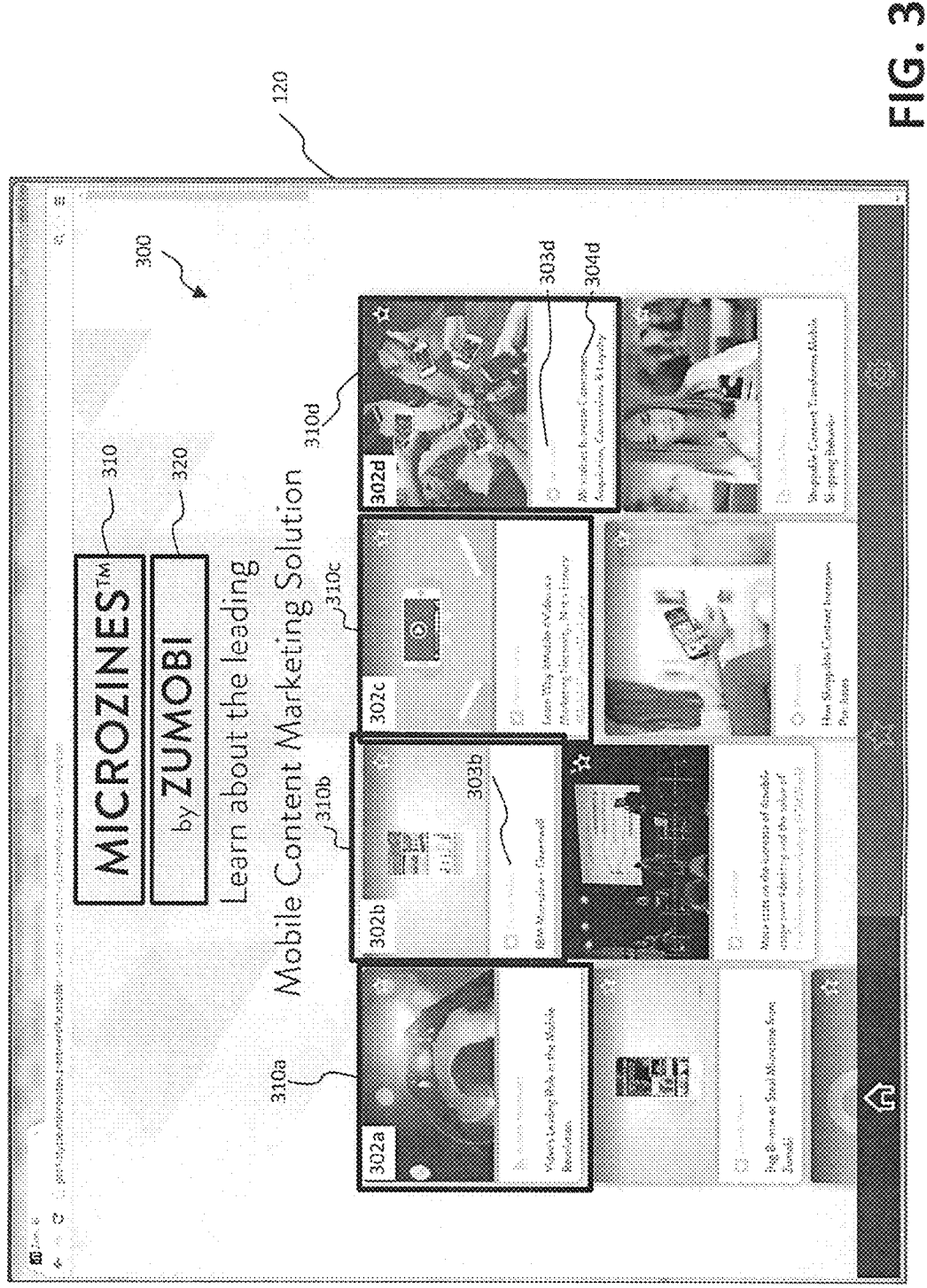
FIG. 3 illustrates an integrated mobile graphical media presentation in accordance with the present disclosure.
Figure 4:
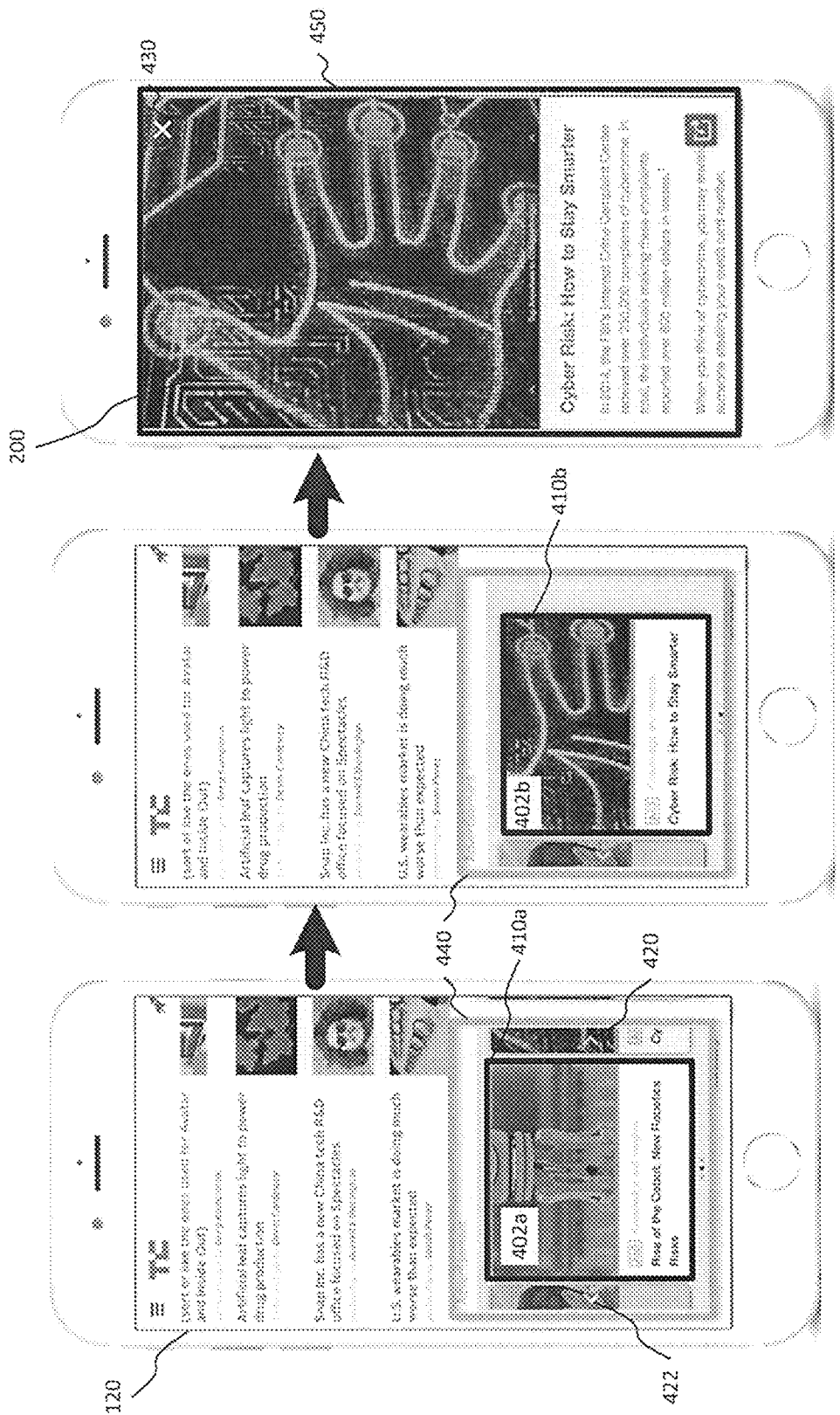
FIGS. 4A and 4B illustrate a sub-content window for pushing an integrated mobile graphical media presentation in accordance with the present disclosure.
FIG. 4C illustrates a graphical user interface configured in accordance with the present disclosure.

In aspects, integration and optimization engine 148 may generate an integrated mobile graphical media presentation based on the compiled-content received from compiled-content sources 102*a-n*. As mentioned above, in some implementations, an integrated mobile graphical media presentation herein may refer to the collection, aggregation, and delivery of content. For example, an integrated mobile graphical media presentation herein may refer to the aggregation of graphical frames housing selectable tiles. These frames may correspond to respective display objects generated from the optimized compiled-content from the multiple compiled-content sources, and laid out according to a layout defined by a template. For example, FIG. 3 shows integrated mobile graphical media presentation 300 displayed on GUI 120 in accordance with the present disclosure. As shown in FIG. 3, the illustrated integrated mobile graphical media presentation 300 is associated with topic 310, "Microzines™" and belongs to entity 320, "Zumobi." Integrated mobile graphical media presentation 300 may include selectable tiles 302*a-d*. Selectable tiles 302*a-d* may be housed within graphical frames 310*a-d*. The layout of graphical frames 310*a-d* housing selectable tiles 302*a-d* is defined by a template that may be predetermined. This is discussed in more detail below.

Integration and optimization engine 148 may be configured to analyze the compiled-content received from compiled-content sources 102*a-n* and to extract particular content from the compiled-content based on optimization rules and requirements. The optimization rules and requirements may be specific to facilitate optimization of the compiled-content for the mobile graphical media presentation. For example, the optimization rules and requirements may include bandwidth, image resolution, storage, or other requirements for mobile optimization, or may be based on the type of content or data of data items in the compiled-content. In some aspects, the optimization rules and requirements may be expressed as an optimization threshold value under which the mobile graphical media presentation may be said to be optimized for mobile device 110. For example, a compiled-content RSS feed may be analyzed to obtain the raw content from the feed, which may include text and images. Integration and optimization engine 148 may determine that, based on optimization rules and requirements, using the raw images in the mobile graphical media presentation would not be desirable. In such an example, the resolution and/or size of the images may be reduced to meet the bandwidth and/or storage requirements.

Figure 2:
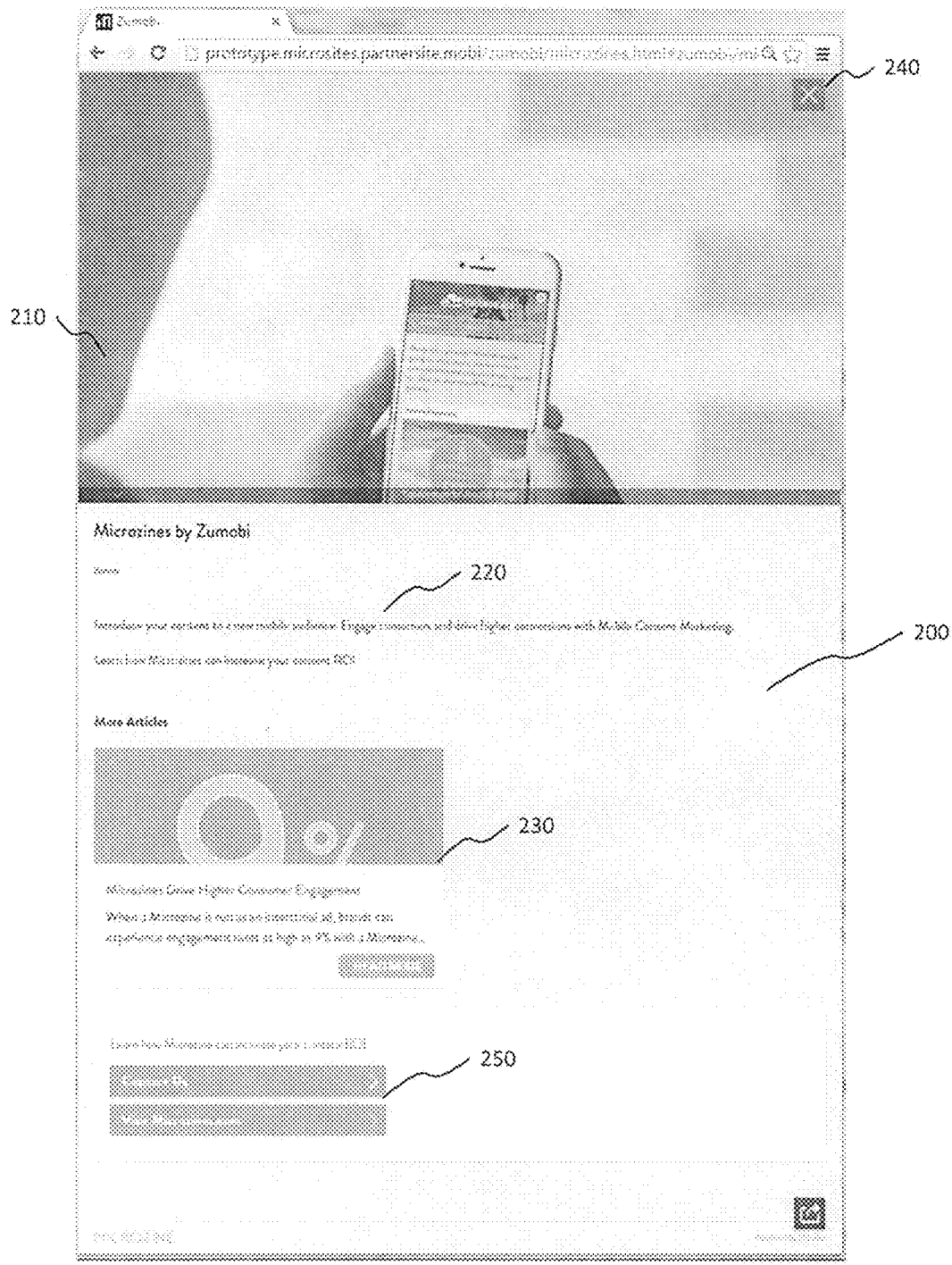
FIG. 2 illustrates a graphical user interface configured in accordance with the present disclosure.

Integration and optimization engine 148 may generate display objects based on the optimized compiled-content received from compiled-content sources 102*a-n* to be presented in a display window in the GUI. For example, display objects may include individual articles. In some aspects, the individual articles may be associated with or include a particular portion of the compiled-content from compiled-content sources 102*a-n*. In these aspects, the display of the individual articles in a display window is rendered and optimized in a format determined by a predetermined template based on the optimization rules and requirements, as shown, for example, in FIG. 2. FIG. 2 illustrates article 200 that includes compiled-content. As seen in FIG. 2, article 200 is displayed on a portion of GUI 120. Although FIG. 2 shows article 200 as occupying the entirety of GUI 120, in some aspects, article 200 may be displayed on a portion of GUI 120 that is less than the entire GUI display (e.g., in a pop-up style rendering).

As further shown in FIG. 2, article image 210 and article content 220 are included in article 200. As discussed above, article image 210 and article content 220 have been optimized for inclusion in the integrated mobile graphical media presentation. Moreover, the format and layout of article 200 is determined by templates. It is noted that the format and layer of any of multiple articles in the integrated mobile graphical media format may have the same format, regardless of the source, platform, or the original format of the compiled-content in the articles.

As further shown in FIG. 2, related article 230 may be included in article 200. Additionally, article 200 may include an option to close article 200. For example, closing button 240 may enable a user to close article 200 and return to the main section of the integrated mobile graphical media presentation. Article 200 may also include call-to-action 250. In some aspects, call-to-action 250 may be a link for more information related to the article, or may be shoppable content. Shoppable content may provide a user of the integrated mobile graphical media presentation with a link to purchasable products or services featured in the content of article 200.

In aspects, integration and optimization engine 148 may be configured to generate a plurality of selectable tiles to form an integrated mobile graphical media presentation. For example, with reference to FIG. 3, selectable tiles 302*a-d* may be generated by integration and optimization engine 148. In some aspects, the selectable tiles may correspond to respective compiled-content display objects. In these aspects, when a selectable tile is selected, the respective compiled-content display object may be opened and displayed in the GUI. For example, selectable tile 302*a* may be displayed within frame 310*a* of integrated mobile graphical media presentation 300. When selectable tile 302*a* is selected, for example by a user, the respective compiled-content display object, associated with selectable tile 302*a*, may be opened and displayed in GUI 120, as shown, for example, in FIG. 2.

In some aspects, the respective compiled-content display object associated with a selectable tile may be indicated by the information included in the tile. For example, as shown in FIG. 3, selectable icon 302*b* may be associated with compiled-content display object titled "IBM Microzine—Greenwall," which is a portion of entity's 320 compiled-content related to topic 310. Additionally, each selectable tile 302*a-d* is related to content from a respective source. For example, selectable tile 302*b* is associated with video feed 303*b*. Additionally, selectable tile 302*d* is associated with a web article feed 303*d*, and represents article 304*d*, "Micro-zines Increase Consumer Acquisition, Conversions & Loyalty," which is a portion of entity's 320 compiled-content related to topic 310.

It should be appreciated that although the GUI 120 is illustrated with four selectable tiles across, GUI 120 is adaptive based on the size and orientation of GUI 120, or the window in which GUI 120 is displayed. For example, the window in which GUI 120 is displayed may be reduced in size. In this case, GUI 120 may adapt to display a lesser number of selectable tiles to match the new window size. In another example, GUI 120 may be zoomed in, in which case GUI 120 may adapt to organize the selectable tiles on GUI 120 such that the entire selectable tiles may be visible in GUI 120. In yet another example, GUI 120 may adapt the layout of the selectable tiles based on whether landscape orientation or portrait orientation is used. In some aspects, the integrated mobile graphical media presentation may include only a portion of the contents being displayed on a GUI. For example, main content may be displayed on a display window of GUI 120. In this example, an integrated mobile graphical media presentation may be displayed on a portion of the display window, and the main content may still remain displayed on the rest of the display window.

In some aspects, the selectable tiles may be displayed in a first window. Upon selection of a selectable tile, the respective compiled-content display object associated with the selected selectable tile may be opened and displayed in a second display window. In some instances, the first window and the second window may be the same window. For example, the selectable tiles may be displayed within a main window, and, upon selection of a selectable tile, the respective compiled-content display object associated with the selected selectable tile may be opened and displayed within the same main window. In this example, the respective compiled-content display object may be displayed over the selectable tiles, or the selectable tiles may be closed and replaced with the respective compiled-content display object. In some aspects, the first and second windows may each be portions of a single display window. For example, the selectable tiles may be displayed within a portion of a main window, and, upon selection of a selectable tile, the respective compiled-content display object associated with the selected selectable tile may be opened and displayed within the same main window, but in a different portion of the main window. In these cases, a new window may not have to be generated when a selectable tile is selected. The first and second windows may be separate windows. In this case, a second display window for displaying the compiled-content display object may be generated. In some aspects, the second window for displaying the compiled-content display object may graphically replace the first display window for displaying the selectable tiles. Graphically replacing the first window with the second window may include closing the first window and displaying the second window, or may include overlaying the second window over the first window, without closing the first window.

Integration and optimization engine 148 may also be configured to generate a plurality of display frames for housing the selectable tiles in the integrated mobile graphical media presentation. For example, FIG. 3 shows frames 310*a-d* for housing selectable tiles 302*a-d*, respectively. In some aspects, the format and layout of the frames may be defined by a template. The template may define a format of the frames that specifies the size and shape of the frame to be generated. The layout of the frames may specify the location and number of frames to be included in the integrated mobile graphical media presentation. In some aspects, the layout specifies the number of frames of a particular data format type to include in the integrated mobile graphical media presentation. The format and layout of the frames may be based on a predetermined template, and/or may be based on the type and data format of the compiled-content of the respective compiled content display objects associated with the selectable tiles housed within the frames. For example, the format of frame 310*b* is specified to accommodate selectable tile 302*b*, which includes compiled-content from a video feed for the respective compiled-content display object titled "IBM Microzine—Greenwall." Similarly, frame 310*c* is formatted to accommodate selectable tile 302*d*, which includes compiled-content from web article feed 303*d*, and represents article 304*d*, "Microzines Increase Consumer Acquisition, Conversions & Loyalty."

In some aspects, the format of the frames may be uniform for all frames in the integrated mobile graphical media presentation. In other aspects each frame in the integrated mobile graphical media presentation may be formatted individually. For example, frame 310*b* is illustrated having a different size from the size of frame 310*d*. Additionally, the size of frame 310*a* and the size of frame 310*c* is the same.

In some aspects, the template defined format and layout may specify that the plurality of frames housing the selectable tiles be displayed concurrently in the integrated mobile graphical media presentation. For example, FIG. 3 shows frames 310*a-d* displayed concurrently. In other aspects, a template defined format and layout may specify that a portion or all of the plurality of frames housing the selectable tiles be displayed non-concurrently in the integrated mobile graphical media presentation. Non-current display may include displaying the plurality of frames in a sequential manner, for example one frame at a time. For example, FIGS. 4A and 4B show an example of frames 410*a* and 410*b* housing selectable tiles 402*a* and 402*b* and displayed in a non-concurrent and sequential manner. In this example, frame 410*a* housing selectable tile 402*a* is displayed on GUI 120. Subsequent to the display of frame 410*a*, frame 410*b* housing selectable tile 402*b* is displayed in GUI 120. In some instances, the subsequent display of frame 410*b* in GUI 120 is in response to a user selection of an option to advance from frame 410*a*. For example, next button 420 may be used to advance from one frame to another, and previous button 422 may be used to go back to a previous frame. In other aspects, the frames automatically advance from one frame to the other without the user's input.

In some aspects, the framework of the entire mobile graphical media presentation may be determined by the template, and integration and optimization engine 148 may generate the integrated mobile graphical media presentation by populating the template with the selectable tiles associated with the optimized compiled-content display objects. It is noted that the template may be a single template, or the template may be distributed over several templates. By providing predetermined templates that integration and optimization engine 148 may use to generate the integrated mobile graphical media presentation and the individual compiled-content display objects, server 140 is provided with functionality to control the look and behavior of the integrated mobile graphical media presentation independent of the compiled-content type and/or source platform. Additionally, a template may be reused for any number of integrated mobile graphical media presentation and/or individual articles, which provides server 140 with scalability and reusability technology for each entity's integrated mobile graphical media presentation, and even across different entities.

In some aspects the delivery of the integrated mobile graphical media presentation may be done through a sub-content display window. The sub-content display window may be part of a display window for displaying content on a page, that is not for displaying the main content of the page. For example, a sub-content display window may be an advertisement display window that is for displaying advertisement content, but not for displaying the main content of a page. The sub-content display window may be a dedicated portion of the main display window. Alternatively, the sub-content display window may be overlaid onto the main content of the main display window. For example, as shown in FIG. 4A, sub-content display window 440 may be used for delivery of the integrated mobile graphical media presentation. Sub-content display window 440, which is used for displaying advertisement information, is shown as a portion of the main display window that is used for displaying the main content. In some aspects, the sub-content display window may be a display window of a fixed-size, such as a banner. The size of the display window may be determined based on the selectable tiles housed within, and may be static or may vary based on the selectable tile being displayed. Thus, the sub-content display window may have a particular display format. In some aspects, the display format of the sub-content display may be determined based on the requirements for delivery of the integrated mobile graphical media presentation, and/or based on other requirements, such as advertisement campaign requirements, or delivery platform. In some aspects, the size and/or geometry of the display window may be determined by a server hosting the integrated mobile graphical media presentation.

Figure 6:
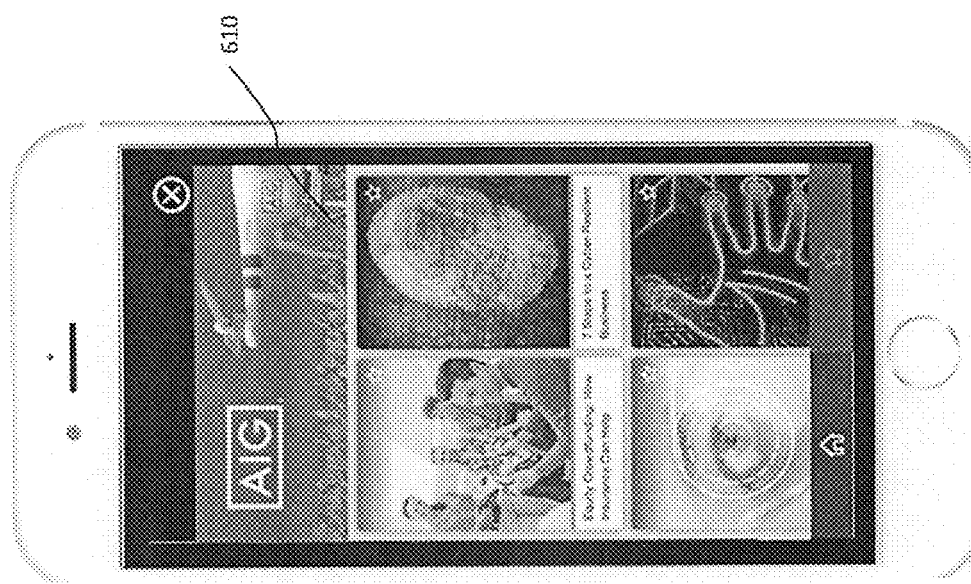
FIG. 6 illustrates a sub-content window for pushing an integrated mobile graphical media presentation in accordance with the present disclosure.

In other aspects, the sub-content display window may be an interstitial advertisement. For example, as illustrated in FIG. 6, the integrated mobile graphical media presentation may be delivered as interstitial advertisement 610. In this example, interstitial advertisement 610 may cover the full screen of a mobile device and may offer a high level of engagement with the integrated mobile graphical media presentation. The integrated mobile graphical media presentation delivered as interstitial advertisement 610 may be displayed at a natural transition point in the flow of an application or mobile website (e.g., between articles and/or activities).

However the integrated mobile graphical media presentation is initially presented, be it a banner, an advertisement window, or an interstitial advertisement, the layout of the presentation may be defined by a template, as discussed above. It is noted that the layout specifying how and what frames housing selectable tiles are presented in the initial sub-content display window may be different from the layout specifying how and what frames housing selectable tiles are presented in the actual display of the integrated mobile graphical media presentation, for example integrated mobile graphical media presentation 300 in FIG. 3. In some aspects, the different layout specifying how and what frames housing selectable tiles are presented in the initial sub-content display window may be defined by a template different than the template specifying the layout of the selectable tiles in the actual display of the integrated mobile graphical media presentation.

With reference to FIGS. 4A-4C and 5, a GUI of a processor-based mobile device optimized for delivering an integrated mobile graphical media presentation is shown. During operation, an integrated mobile graphical media presentation (e.g., integrated mobile graphical media presentation 300 in FIG. 5) is generated from compiled-content received from multiple source based on a first template. The integrated mobile graphical media presentation is initially presented via sub-content display window 440 in FIG. 4A. The initial presentation includes displaying frame 410a housing selectable tile 402a within sub-content display window 440 based on a layout defined by a template. Advance button 420 is also provided within sub-content display window 440 to advance from frame 410a housing selectable tile 402a to frame 410b housing selectable tile 402b. In some aspects, an auto-advance feature may be provided, and the frames displayed within the sub-content window may auto-advance without the need of selecting the advance button. In this example, selectable tile 402b is associated with compiled-content display object 200 in FIG. 4C, and selection of selectable tile 402b will result in opening and displaying of compiled-content display object 200, as shown in FIG. 4C. It is noted that sub-content display window 440 may occupy a portion of the main display window, a fixed size sub-window, or may occupy the entirety of the main display window, as an interstitial advertisement.

Upon selection of selectable tile 402b, compiled-content display object 200, which is associated with selectable tile 402b, is opened and displayed in first display window 450, graphically replacing sub-content display window 440. In some aspects, first display window 450 may occupy the entirety of the display window, or may only occupy a portion of the main display window. As discussed above, display object 200 may include individual articles associated with or include a particular portion of the compiled-content from compiled-content sources 102a-n.

Figure 5:
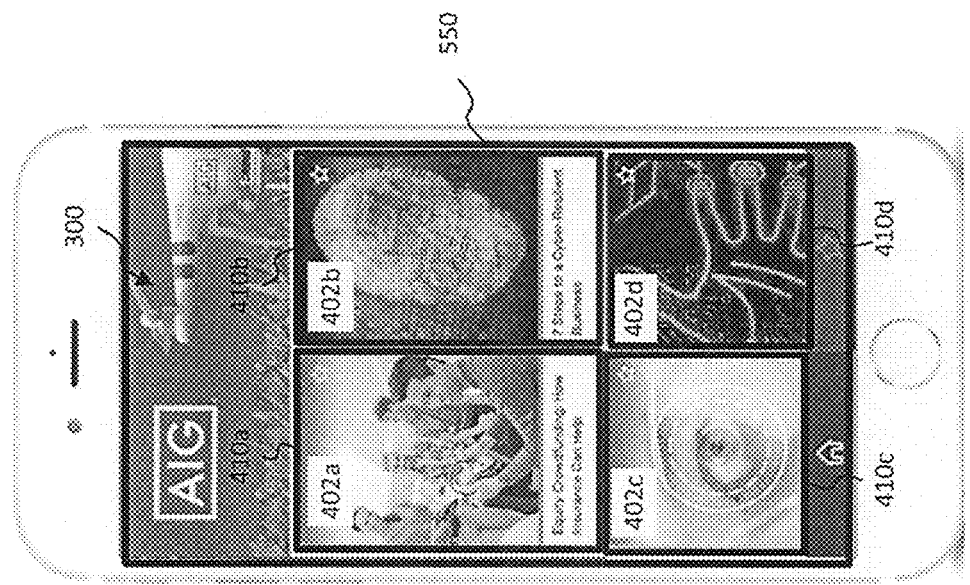
FIG. 5 illustrates an integrated mobile graphical media presentation in accordance with the present disclosure.

In some aspects, prior to opening and displaying the compiled-content display object in the first display window, the integrated mobile graphical media presentation is first opened. The opened integrated mobile graphical media presentation may be opened in the background, without being displayed, or may be opened and displayed in a second display window. In this case, the integrated mobile graphical media presentation displayed in the second window may graphically replace the sub-content display window displaying the selectable tile. In some aspects, the second window may graphically replace the entire content being displayed within the main window including the sub-content display window. For example, upon selection of selectable tile 402b, shown in FIG. 4B, integrated mobile graphical media presentation 300 is opened and may be momentarily displayed in second display window 550, as shown in FIG. 5, graphically replacing the entire main display window including sub-content display window 440. As discussed above, integrated mobile graphical media presentation 300 is displayed in second window 550 based on a layout defined by the template. In some aspects, the layout defining the display of the frames housing the selectable icons within the sub-content display window is different than the layout defining the display of the frames housing the selectable icons within the integrated mobile graphical media presentation. For example, as shown in FIGS. 4A and 4B, based on a second layout, frames 402a and 402b are displayed within sub-content display window 440 in a sequential manner, one at a time, not concurrently. As shown in FIG. 5, based on a first layout, frames 402a and 402b are displayed concurrently, at the same time.

In some aspects, as soon as the integrated mobile graphical media presentation is opened, the compiled-content display object is opened and displayed. In aspects, displaying the compiled-content display object graphically replaces the second display window. For example, as soon as integrated mobile graphical media presentation 300 is opened and momentarily displayed in second display window 550 based on the first layout, compiled-content display object 200 is opened and displayed in first display window 450, graphically replacing second display window 550, as shown in FIG. 4C.

As shown in FIG. 4C, a close button 430 for closing first display window 450 displaying compiled-content display object 200 is provided. In other aspects, the option to close the first display window may be provided using a different mechanism than a close button. Those of skilled in the art would recognize numerous technique exist for closing a display object. Upon selection of the close button 430, first display window 450 displaying compiled-content display object 200 is closed, and second display window 550 displaying the integrated mobile graphical media presentation 300 based on the first layout is again displayed. In some aspects, integrated mobile graphical media presentation 300 may include a close option. For example, a close button may be provided for integrated mobile graphical media presentation 300, which, when activated, may cause integrated mobile graphical media presentation 300 to be closed. In this example, upon closing integrated mobile graphical media presentation 300, the display may return to the main content display window on which the initial sub-content display window may be displayed. Thus, aspects of the present disclosure provide a GUI with functionality to push an integrated mobile graphical media presentation through a sub-content display window.

As noted above, the integrated mobile graphical media presentation may be pushed to mobile device 110 for presentation using GUI 120, through a sub-content display window. Typical systems lack functionality to deliver an integrated mobile graphical media presentation through a sub-content display window. Instead, in a typical system, a sub-content display window may present advertisement content, which when selected by a user, may display content related to the advertisement content. The user may then close advertisement and return to the main content. However, the advertisement is typically a one-of, standalone item, from a single source. There is no functionality in the typical systems to push an integrated mobile graphical media presentation, with compiled-content from multiple sources, through the sub-content display window, and there is no functionality in typical systems to bring the user to, after selection of a selectable tile and closing of the associated display object, the actual integrated mobile graphical media presentation, rather than merely to the original content. The disclosed aspects of the present disclosure provide a seamless integration of multiple sources into a single presentation and provide functionality to push the integrated presentation through a sub-content display window of a GUI.

Figure 7:
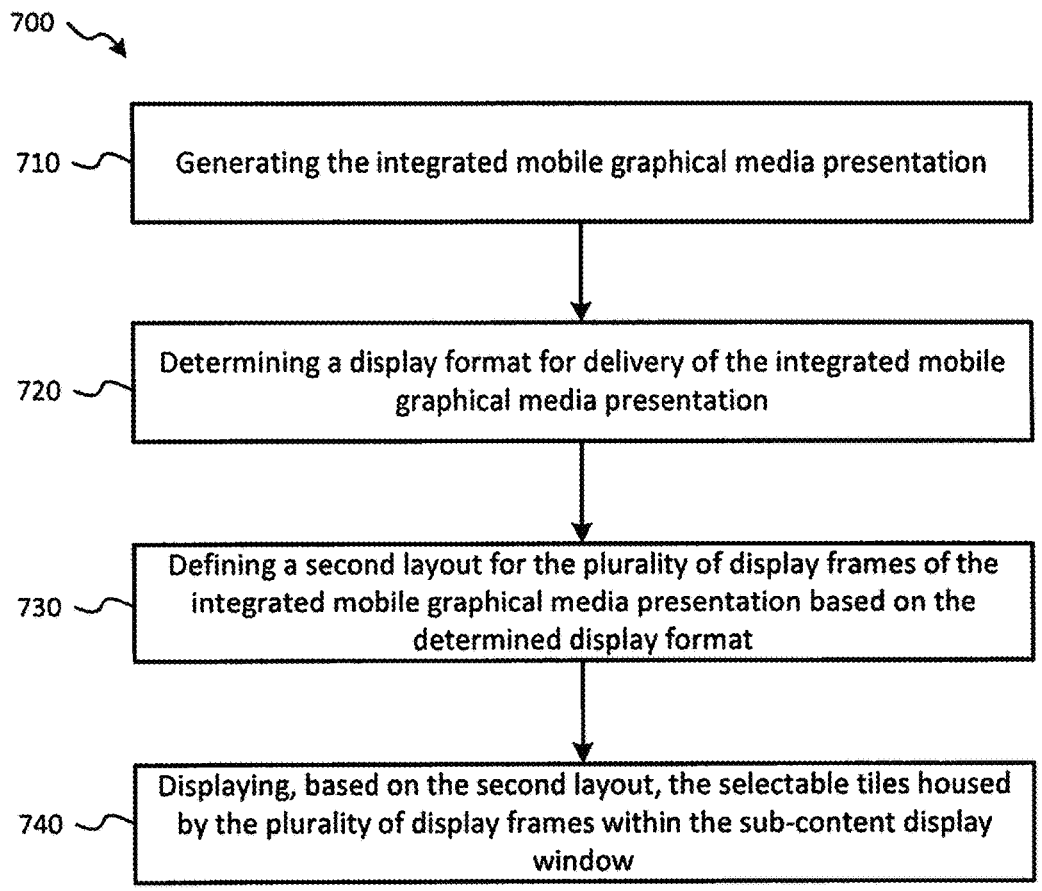
FIG. 7 is a flow diagram illustrating aspects of a method for delivering an integrated mobile graphical media presentation in a GUI.

FIG. 7 shows a flow diagram illustrating aspects of a method for delivering an integrated mobile graphical media presentation in a graphical user interface shown as method 700. In an aspect, method 700 may be performed by integration and optimization engine 148 of server 140 of FIG. 1. At 710, method 700 includes generating the integrated mobile graphical media presentation. The compiled-content may be associated with a topic of the integrated mobile graphical media presentation. In aspects, generating the integrated mobile graphical media presentation may include formatting compiled-content provided from at least one compiled-content source to generate a plurality of compiled-content display objects. Generating the integrated mobile graphical media presentation may also include generating a plurality of display frames. In some aspects, each display frame in the plurality of display frames houses a selectable tile corresponding to a respective compiled-content display object of the plurality of compiled-display objects from the at least one compiled-content source. Additionally, generating the integrated mobile graphical media presentation may also include defining a first layout of the plurality of display frames. The first layout may be defined by a template based on the data formats of the respective compiled-content display objects corresponding to each selectable tile housed by each display frame. In some aspects, the first layout is configured to concurrently display multiple frames of the plurality of frames.

At 720, the method includes determining a display format for delivery of the integrated mobile graphical media presentation. In some aspects, the format for delivery of the integrated mobile graphical media presentation may be based on system requirements, available GUI space, type of mobile device, entity specific requirements, etc. In some aspects, the format for delivery of the integrated mobile graphical media presentation may be an advertisement banner, a fixed-size sub-window, or an interstitial advertisement.

At 730, the method includes defining a second layout for the plurality of display frames of the integrated mobile graphical media presentation based on the determined display format. In some aspects, the second layout specifies a sequential manner to present the selectable tiles housed by the plurality of display frames within the sub-content display window.

At 740, the method includes displaying, based on the second layout, the selectable tiles housed by the plurality of display frames within the sub-content display window.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for delivering an integrated mobile graphical media presentation in a graphical user interface (GUI), the method comprising:
generating the integrated mobile graphical media presentation, wherein the generating the integrated mobile graphical media presentation comprises:

formatting compiled-content provided from at least one compiled-content source to generate a plurality of compiled-content display objects;

generating a plurality of display frames for the integrated mobile graphical media presentation, each display frame in the plurality of display frames housing a selectable tile corresponding to a respective compiled-content display object of the plurality of compiled-display objects from the at least one compiled-content source; and defining a first layout of the plurality of display frames on the integrated mobile graphical media presentation, the first layout being defined by a template based on the data formats of the respective compiled-content display objects corresponding to each selectable tile housed by each display frame in the plurality of display frames, the first layout configured to concurrently display multiple frames of the plurality of frames;

defining a second layout for the plurality of display frames of the integrated mobile graphical media presentation based on the determined display format, wherein the second layout specifies a sequential manner to present the selectable tiles housed by the plurality of display frames within a sub-content display window having the determined display format displayed on at least a first portion of the GUI;

displaying, based on the second layout, the selectable tiles housed by the plurality of display frames within the sub-content display window; and detecting a user selection of the selectable tile displayed within the sub-content display window;

in response to the user selection of the selectable tile:
opening, on the GUI, the integrated mobile graphical media presentation according to the first layout:
automatically opening and displaying, in a display window on the GUI, the respective compiled-content display object corresponding to the selected selectable tile, wherein the display window graphically replaces the integrated mobile graphical media presentation, wherein an option is provided for closing the display window;

detecting a selection of the option for closing the display window; and upon detection that the option for closing the display window is selected:
closing the display window; and
returning to the opened integrated mobile graphical media presentation on the GUI based on the first layout.

2. The method of claim 1, wherein the display window occupies an entirety of the GUI display space.

3. A method for delivering an integrated mobile graphical media presentation in a graphical user interface (GUI), the method comprising:

generating the integrated mobile graphical media presentation, wherein the generating the integrated mobile graphical media presentation comprises:
formatting compiled-content provided from at least one compiled-content source to generate a plurality of compiled-content display objects;

generating a plurality of display frames for the integrated mobile graphical media presentation, each display frame in the plurality of display frames housing a selectable tile corresponding to a respective compiled-content display object of the plurality of compiled-display objects from the at least one compiled-content source; and defining a first layout of the plurality of display frames on the integrated mobile graphical media presentation, the first layout being defined by a template based on the data formats of the respective compiled-content display objects corresponding to each selectable tile housed by each display frame in the plurality of display frames, the first layout configured to concurrently display multiple frames of the plurality of frames;

defining a second layout for the plurality of display frames of the integrated mobile graphical media presentation based on the determined display format, wherein the second layout specifies a sequential manner to present the selectable tiles housed by the plurality of display frames within a sub-content display window having the determined display format displayed on at least a first portion of the GUI;

displaying, based on the second layout, the selectable tiles housed by the plurality of display frames within the sub-content display window; and detecting a user selection of the selectable tile displayed within the sub-content display window;

opening, in response to the user selection of the selectable tile, in a display window on the GUI, the respective compiled-content display object corresponding to the selected selectable tile, wherein an option is provided for closing the display window; and upon detection that the option for closing the display window is selected,
closing the display window; and
opening the integrated mobile graphical media presentation on the GUI based on the first layout.

4. The method of claim 1, wherein the display format for delivery of the integrated mobile graphical media presentation is one of interstitial, banner, and fixed-size window.

5. The method of claim 1, wherein the plurality of compiled-content display objects comprises objects having a plurality of data formats, and wherein at least one compiled-content object of the plurality of compiled-content display objects is formatted based on predetermined optimization requirements.

6. The method of claim 5, wherein the predetermined optimization requirements are requirements related to at least one of bandwidth limits and storage limits.

7. The method of claim 5, wherein the predetermined optimization requirements are expressed as threshold values, and wherein the formatting the at least one compiled-content object of the plurality of compiled-content display objects based on predetermined optimization requirements includes formatting the at least one compiled-content object of the plurality of compiled-content display objects such that the integrated mobile graphical media presentation has a size less than a predetermined size.

8. The method of claim 1, wherein the first layout defined by the template defines at least one of a number of display frames corresponding to compiled-content display objects of a particular data format to be included in the integrated mobile graphical media presentation, and a location of display frames corresponding to compiled-content display objects of a particular data format within the integrated mobile graphical media presentation.

9. The method of claim 1, wherein the at least one compiled-content source includes a plurality of compiled-content sources, and wherein each compiled-content source of the plurality of compiled-content sources is of a type selected from the group consisting of a social media stream, a blog publisher, a video source, a news source, a web server, a media server, and a Rich Site Summary (RSS) feed.

10. A non-transitory computer readable medium of a processor-based mobile device optimized for delivering an integrated mobile graphical media presentation via a graphical user interface (GUI of said processor-based mobile device, said computer readable medium including instructions executable on a processor of said processor-based mobile device for causing said processor to:

generate a portion of the GUI for displaying a sub-content display window, wherein a plurality of selectable icons are displayed, in a sequential order in the sub-content display window, each selectable icon of the plurality of selectable icons corresponding to a respective display object containing at least a portion of compiled-content received by at least one compiled-content source, wherein displaying, in a sequential manner, the plurality of selectable icons, is based on a sub-content layout defined by a template based on a determined display format for delivery of the integrated mobile graphical media presentation, and wherein the instructions include instruction for causing the processor to, upon selection of at least one selectable icon:

open the integrated mobile graphical media presentation according to an integrated layout, wherein the integrated layout is configured to concurrently display multiple selectable icons of the plurality of selectable icons;

automatically display the contents of the respective display object corresponding to the selected at least one selectable icon, wherein an option is provided for closing the display of the contents of the respective display object;

accept a selection of the option for closing the display of the contents of the respective display object; and upon selection of the option for closing:

close the display of the contents of the respective display object; and display the integrated mobile graphical media presentation according to the integrated layout.

11. The non-transitory computer readable medium of claim 10, wherein each selectable icon of the plurality of selectable icons is displayed as a tile, the tile including an indication of at least one of the compiled-content source of the compiled-content in the respective display object, a title of the respective display object, and an image related to the respective display object.

12. The non-transitory computer readable medium of claim 10, wherein the determined display format for delivery of the integrated mobile graphical media presentation is one of interstitial, banner, and fixed-size window.

13. The non-transitory computer readable medium of claim 10, wherein the at least a portion of the compiled-content in the respective display objects has a plurality of data formats, and each respective display object is associated with a topic of the integrated mobile graphical media presentation, and wherein the at least a portion of the compiled-content in the respective display object is reformatted from an original format received from the at least one compiled-content source based on optimization requirements.

14. The non-transitory computer readable medium of claim 13, wherein the optimization requirements are requirements related to at least one of bandwidth limits and storage limits of one of the mobile device or a content database, the content database storing the integrated mobile graphical media presentation.

15. The non-transitory computer readable medium of claim 13, wherein the sub-content layout defined by the template defines the sequential order of display of the plurality of selectable icons, and wherein the integrated layout defined by the template defines at least one of a number of selectable icons corresponding to display objects containing at least a portion of the compiled-content of a particular data format to be included in the integrated mobile graphical media presentation, and a location of selectable icons corresponding to display objects containing at least a portion of the compiled-content of a particular data format to be included within the integrated mobile graphical media presentation.

16. The non-transitory computer readable medium of claim 10, wherein the automatic display of the contents of the respective display object graphically replaces the display of the integrated mobile graphical media presentation.

* * * * *